(12) United States Patent
Shiell et al.

(10) Patent No.: US 7,990,544 B2
(45) Date of Patent: Aug. 2, 2011

(54) MICROCONTROLLER-BASED IMAGING SYSTEM UTILIZING A CMOS IMAGE SENSOR ARRAY

(75) Inventors: Ralph Charles Shiell, Peterborough (CA); Jeffrey Nicholas Philippson, Peterborough (CA); Matthew David Roberts Ugray, Peterborough (CA)

(73) Assignee: Trent University, Peterborough, Ontario (CA)

( * ) Notice: Subject to any disclaimer, the term of this patent is extended or adjusted under 35 U.S.C. 154(b) by 160 days.

(21) Appl. No.: 12/453,834

(22) Filed: May 22, 2009

(65) Prior Publication Data

US 2009/0296104 A1    Dec. 3, 2009

Related U.S. Application Data

(60) Provisional application No. 61/071,938, filed on May 27, 2008.

(51) Int. Cl.
*G01B 9/02*    (2006.01)
(52) U.S. Cl. ........................................................ 356/519
(58) Field of Classification Search .................. 356/454, 356/480, 519
See application file for complete search history.

(56) References Cited

U.S. PATENT DOCUMENTS

| | | | |
|---|---|---|---|
| 5,841,126 A | 11/1998 | Fossum et al. | |
| 6,549,239 B1 * | 4/2003 | Tao | 348/371 |
| 6,918,540 B2 * | 7/2005 | Good | 235/462.01 |
| 2007/0067104 A1 * | 3/2007 | Mays | 701/211 |
| 2007/0110290 A1 * | 5/2007 | Chang et al. | 382/128 |
| 2007/0116347 A1 * | 5/2007 | Hong | 382/131 |
| 2007/0133736 A1 * | 6/2007 | Chen et al. | 378/5 |
| 2007/0233351 A1 * | 10/2007 | Wang | 701/70 |
| 2007/0265813 A1 * | 11/2007 | Unal et al. | 703/2 |
| 2008/0278777 A1 * | 11/2008 | Park | 358/498 |

OTHER PUBLICATIONS

Predko, M.,"Programming and Customizing PICmicro® Microcontroller, $2^{nd}$ Edition", 2001, McGraw-Hill, New York, with diskette.
Bhatia, Study of Longitudinal Mode Structure of Laser by optical Spectrum Analyzer, Am. J. Phys. 52 (8), 1984, pp. 738-741.
Bures et al., Utilisation d'une ligne de microphotodiodes en spectrographie Fabry-Perot, Applied Optics 19 (8), 1980, pp. 1373-1379.
Geldi et al., Development of Surgical Diode-Laser System Controlling the Mode of Operation, Photomedicine and Laser Surgery, 24(6), 2006, pp. 723-729.
Hercher, Tunable Single Mode Operation of Gas Lasers Using Intracavity Titled Etalons, Applied Optics, 8(6), 1969, pp. 1103-1106.
Magnus et al., Optical Pumping and Electromagnetically Induced Transparency in a Lithium Vapour, J. Opt. B: Quantum and Semiclassical Optics 7, 2005, pp. 109-118.

(Continued)

*Primary Examiner* — Patrick J Connolly (57) ABSTRACT

Described herein is a an optical sensing unit, the optical sensing unit including a one-dimensional array of sensor locations, each sensor location being responsive to an incident optical signal to generate a local analog intensity value representative of the intensity of the optical signal at the sensor location, the sensing unit including a digital interface to deliver a local digital intensity value corresponding to the local analog intensity value, a first microcontroller function in communication with the digital interface for sequentially collecting local digital intensity values to form a group of digital intensity values corresponding to an intensity variation across the array over a predetermined sensing period, a second microcontroller function cooperating with the first microcontroller function to receive the group of digital intensity values for transfer to an output device.

20 Claims, 5 Drawing Sheets

OTHER PUBLICATIONS

McIntyre et al., An Inexpensive Optical Spectrum Analyser for Measuring Laser Linewidths, J. Phys.E:Sci. Instrum, 17, 1984, pp. 274-276.

Mukaro et al., In Situ Measurement of the Energy Gap of a Semiconductor Using a Microcontroller-based System, Eur. J. Phys., 27, 2006, pp. 531-538.

O'Hora et al., Least Squares Algorithm for Rapid Analysis of Fabry-Perot Fringe Patterns, J. Opt. A: Pure Appl. Opt., 7, 2005, pp. S364-S367.

Philippson et al., Compact angle-Resolved Optical Spectrum Analyzer Using a Programmable Microcontroller Approach, J. Opt. A: Pure Appl. Opt., 9, 2007, pp. 1024-1029.

Reidy et al., Temperature-Programmed GC Using Silicon Microfabricated Columns with Integrated Heaters and Teperature Sensors, Anal Chem, 79, 2007, pp. 2911-2917.

Schroder et al., Single Mode Operation of CW Dye Lasers, Appl. Phys. 7, 1975, pp. 21-28.

Ugray et al., Microcontroller-based Wavemeter Using Compression Locking of an Internal Mirror Reference Laser, Rev. Sci. Instrum, 77, 2006.

Wieman et al., Using Diode Lasers for Atomic Physics, Rev Sci. Instrum, 62 (1), 1991, pp. 1-20.

Born et al., Principles of Optics 7th Ed., 2002, pp. 313-318.

Horowitz et al., The Art of Electronics, Cambridge University Press, 2nd Ed., 1989, pp. 723-727.

\* cited by examiner

MICROCONTROLLER-BASED IMAGING SYSTEM UTILIZING A CMOS IMAGE SENSOR ARRAY

REFERENCE TO COPENDING APPLICATIONS

The entire subject matter of U.S. Provisional application 61/071,938 filed May 27, 2008 and entitled MICROCONTROLLER-BASED IMAGING SYSTEM UTILIZING A CMOS IMAGE SENSOR ARRAY is incorporated herein by reference. The applicant claims priority benefit under Title 35, United States Code, Section 19 of the above application.

FIELD OF THE INVENTION

The present invention relates to imaging systems, in particular those making use of microcontroller operated image sensors such as is used in multi-channel spectrum analysis systems and methods therefor.

DESCRIPTION OF THE RELATED ART

For laser applications requiring precise frequency control it is important to obtain a single longitudinal mode and many locking techniques exist to accomplish this [1, 2, 3]. This is especially important when addressing particular atomic or molecular transitions, such as in laser cooling, high-resolution spectroscopy and quantum optics. Monitoring the mode-structure of laser systems in real time has traditionally been accomplished using an optical spectrum analyzer (OSA) that varies the separation between a pair of highly reflecting mirrors and detects the transmitted intensity from incident laser light [4]. Currently available devices are expensive, require a dedicated oscilloscope, and as a complete system have a large footprint, precluding the provision of an OSA for each laser required to operate on a single mode.

Fixed Fabry-Perot interferometers can convey the same information about the laser mode-structure through a spatially, rather than temporally, varying interference pattern. One- and two-dimensional arrays of photosensors that can detect such a pattern have existed for some time [5, 6], but until recently there has been no convenient set of tools to acquire and process this image in real time and present it in a form that may be readily interpreted by the eye. A complicated array of integrated circuits (ICs) including ADCs to digitise the photosensor readout, or alternatively a dedicated computer with interface card and associated software [7], could in principle perform the processing, but the first of these alternatives would require a prohibitive amount of time to design and construct, while the second is an expensive option that represents an inefficient use of resources. It would be desirable to provide a novel approach to this task.

SUMMARY OF THE GENERAL INVENTIVE CONCEPT

In an exemplary embodiment, there is provided an imaging system comprising an optical sensing unit with a plurality of sensor locations. Each sensor location is responsive to an incident optical signal to generate a local analog intensity value representative of the intensity of the optical signal at the sensor location. The sensing unit includes a digital interface to deliver a local digital intensity value corresponding to the local analog intensity value. A first microcontroller function is provided in communication with the digital interface for sequentially collecting local digital intensity values to form a group of digital intensity values corresponding to an intensity variation across the array over a predetermined sensing period. A second microcontroller function is provided for cooperating with the first microcontroller function to receive the group of digital intensity values for transfer to an output device.

In some exemplary embodiments, the plurality of sensor locations are oriented in a one dimensional array.

In some exemplary embodiments, the output device includes a display unit or a data storage unit.

In some exemplary embodiments, the data storage unit includes a computer or a storage device.

In some exemplary embodiments, the display unit includes a liquid crystal display.

In some exemplary embodiments, the image sensing unit and the microcontrollers are configured to transfer instructions for changing system parameters In some exemplary embodiments, the liquid crystal display has a plurality of rows and columns. A driver function is provided to scan the display grid progressively by row, each row corresponding to a sensor location or consecutive group of sensor locations, to display a marker on each row at a position corresponding to the intensity of the optical signal at the sensor location or consecutive group of sensor locations. The liquid crystal display is oriented to display the intensity values as a horizontal trace.

In some exemplary embodiments, the first and second microcontroller functions are provided by corresponding first and second microcontroller units.

Some exemplary embodiments further comprise a data transfer bus between the first and second microcontroller units.

In some exemplary embodiments, the data transfer bus utilizes a transfer synchronization protocol.

In some exemplary embodiments, the transfer synchronization protocol is implemented using a first signal line and a second signal line. The protocol includes a first mode in which the second microcontroller is a receiver and sets the first signal line to logic-high indicating a request for data. A second mode is provided in which the first microcontroller is a sender and places data on the data transfer bus. The sender sets the second signal line to logic-high indicating that data has been placed on the data transfer bus. The receiver reads data from the data transfer bus and sets the first signal line to logic-low indicating that data has been received. The sender sets the second signal line to logic-low to ensure that the same data value is not retransferred on the next request from the receiver.

In some exemplary embodiments, the image sensing unit and the microcontrollers are configured to transfer instructions for changing system parameters.

In some exemplary embodiments, the first and second microcontroller units operate on independent clock frequencies.

In some exemplary embodiments, the first and second microcontroller units operate on a common clock frequency or otherwise dependent clock frequencies.

In some exemplary embodiments, the first and second microcontroller units operate at the same voltage, that voltage defining the logic-high level for exchanging data between the optical sensing unit and the first microcontroller, exchanging data between the two microcontroller units on the data transfer bus, and exchanging data between the second microcontroller unit and an output device.

In some exemplary embodiments, the first microcontroller unit operates at a voltage determined by the requirements of the optical sensing unit, the second microcontroller unit operating at a voltage determined by the requirements of the output device, the data transfer bus including digital logic signals at both voltages utilizing the wide input voltage ranges of the microcontrollers.

In some exemplary embodiments, the optical sensing unit has a sensitivity that is adjusted by a user according to a power level of the incident optical signal.

In some exemplary embodiments, the optical sensing unit has a plurality of configuration registers including window height and row start for windowing, and shutter width for pixel integration time, the registers being adjusted according to measured characteristics of the incident optical signal, the registers being accessible to the user.

Some exemplary embodiments further comprise a dispersive device positioned at an upstream location relative to the optical sensing unit, on an optical path to receive an incident light beam. The optical sensing unit is positioned at a downstream location to receive an incident optical interference pattern from the dispersive device thereon. The optical sensing unit is oriented to register intensity values with positions corresponding to different wavelengths present or absent in the incident light beam. The digital intensity values collected by the first microcontroller function are representative of the intensity variation across the sensor locations corresponding to the wavelength content of the light beam within a particular range of wavelengths.

In some exemplary embodiments, the dispersive device includes a transmissive or reflective diffraction grating, or a prism, or a Fabry-Perot or Fizeau interferometer.

In still another exemplary embodiment, there is provided a method of imaging an optical signal, comprising providing a one-dimensional array of sensor locations, each sensor location being responsive to an incident optical signal to generate a local analog intensity value representative of the intensity of the optical signal at the sensor location, providing a digital interface to deliver a local digital intensity value corresponding to the local analog intensity value, providing a first microcontroller in communication with the digital interface, configuring the first microcontroller to sequentially collect local digital intensity values to form a group of digital intensity values corresponding to an intensity variation across the array over a predetermined sensing period, providing a second microcontroller to receive the group of digital intensity values, and configuring the second microcontroller to transfer to the group of digital intensity values to an output device.

BRIEF DESCRIPTION OF THE DRAWINGS

Several exemplary embodiments of the present invention will be provided, by way of examples only, with reference to the appended drawings, wherein.

DESCRIPTION OF THE EXEMPLARY EMBODIMENTS

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical, electrical or other configurations illustrated in the drawings are intended to exemplify embodiments of the invention. However, other alternative mechanical, electrical or other configurations are possible which are considered to be within the teachings of the instant disclosure. Furthermore, unless otherwise indicated, the term "or" is to be considered inclusive.

As is discussed, in one embodiment, the advent of CMOS image sensors [8] and programmable microcontrollers [9] has provided a new set of tools which are compact and inexpensive, and can be integrated within the device with rapid programming and reprogramming. These features allow for multiple imaging systems to be made available in new and innovative ways in a laboratory for diagnostic purposes for laser beam profile analysis or the determination of laser mode structure.

Figure 1:
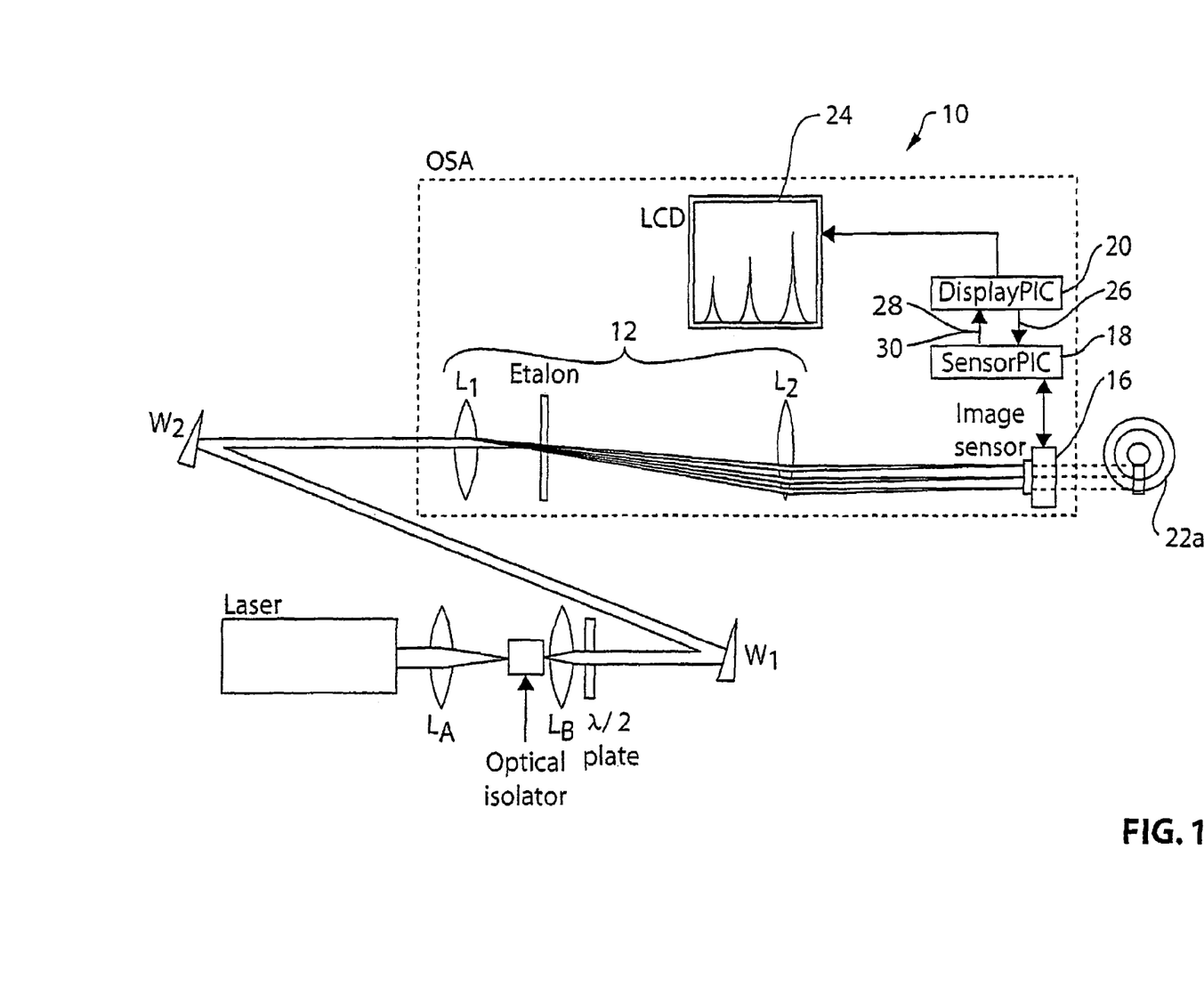
FIG. 1 is a schematic diagram of one embodiment of an optical spectrum analyzer and light source.

As will be described, FIG. 1 schematically illustrates a setup showing the optics that sample the laser beam to be analyzed and the microcontroller-driven, angle-resolved, optical spectrum analyzer.

In one example, the angle-resolved optical spectrum analyzer (hereinafter referred to as an "OSA") is shown at 10 and which includes two main parts: the optical elements 12 create a fringe pattern 22a containing the laser mode information, and the hardware (comprising an image sensor 16, in this case in the form of a CMOS image sensor, a pair of microcontrollers 18, 20 and a display 24 in the form of an LCD) captures, processes and displays the data. The configuration of the OSA 10 is depicted in FIG. 1, in which lenses $L_1$ and $L_2$ (with focal lengths $f_1$ and $f_2$, respectively) form a telescope with an etalon 22 at their mutual focal point. A section of the Fabry-Perot pattern illuminates the CMOS image sensor 16; the data is sent to the microcontrollers 18, 20 and displayed on the LCD 24.

Optical Setup

The Fabry-Perot etalon 22 is used to produce a stationary interference pattern and, as the pattern is circularly symmetric, all of the required information can be obtained in a radial scan. Accordingly, the image sensor 16 is placed such that its central row of pixels falls on a radial line of the interference pattern, intersecting three distinct fringes, for reasons we now discuss.

There are two main optical criteria for optimal system performance: the laser beam should span the active width of the image sensor 16 (6.66 mm), and the desired number of fringes should fit within this beam. In one example, the beam has a width $d_1=2.5$ mm at lens $L_1$ and a width $d_2=(f_2/f_1)d_1=8$ mm at the image sensor, which is close to optimal. The fringe of order p is focussed at the back focal plane of lens $L_2$ with a diameter given by $$D_p^2 = \frac{4f_2^2 n' \lambda}{n^2 h}(p-1+\varepsilon), \quad (1)$$

where λ is the wavelength of the light, h is the thickness of the etalon, $f_2$ is the focal length of lens $L_2$, n and n' are the refractive indices outside and inside the etalon respectively, and ε is the excess fraction [10]. Lens $L_2$ therefore performs two functions: it re-collimates the diverging beam from lens $L_1$ while also focusing each fringe from the etalon 22 within the beam. It is chosen such that three intensity peaks can fit within the width of the image sensor; this ensures that at least two fringes are always visible, clearly delineating one full free spectral range of the etalon.

The CMOS Image Sensor

In this example, a Micron MT9M001C12STM monochrome image sensor 16 with 1024 rows×1280 columns of 5.2 μm×5.2 μm pixels is used to convert from the optical to the digital domain, though components from other manufacturers may be used as desired. These low power, 3.3 V logic devices are widely used for photographic applications and are therefore readily available and relatively inexpensive. 10-bit intensity values are placed on a bus, synchronized with an external clock source that must lie in the range 1 to 48 MHz. The sensor is driven by a microcontroller, which we call the SensorPIC, configured to provide a clock output at ¼ of its internal clock frequency (8 MHz), giving a clock output at 2 MHz.

The required slice of the interference pattern is obtained by using the microcontroller to set an observation window for the sensor that spans the full 6.66 mm active width of the sensor with a height of three rows (the minimum number permitted). The sensitivity of the sensor is controlled by setting the pixel integration time to match the incident laser power and avoid saturation due to any ambient light; a value of 7.55 ms was used for the results shown here. Both these settings are achieved using the sensor's configuration registers: Window Height and Row Start for the windowing, and Shutter Width for the pixel integration time.

The Display

The display 24, in this case, is an Optrex F-51477GNB-FW-AD display with an LCD having 240 rows×320 columns, which for this application is rotated by 90° so that the y-axis, reflecting the intensity values, is the long axis. This enables adjacent points to be plotted consecutively according to their x-values, since the display 24 must be written to sequentially by row. Maintaining an image on the display 24 requires the refresh rate to fall within a window determined both by the pixels' brightness slew-rate, and their decay time-constant. Optimization of this is discussed in section 3.

The microcontrollers 18, 20 used have 8-bit ports which allow us to read 8 bits of the 10-bit intensity values provided by the image sensor 16 during an instruction cycle, giving a dynamic range of 256 for the y-axis, identical to the displays of many commercial oscilloscopes. Greater resolution can be achieved by storing the information from the most significant bits (MSB) in a simple memory chip (such as a flip-flop) on one clock cycle, and recombining this with the corresponding least significant bits prior to writing to the display. This technique is limited only by the intensity resolution of the chosen image sensor and the number of columns of the display 24. Alternative displays can be purchased with a greater pixel count if needed, with 480×640 (VGA) widely available. When plotting the spectrum on the display, the position of each row corresponds to a particular x-position on the sensor, while the y-value corresponds to the intensity recorded at that location. A line of dark pixels is placed within each vertical row of the display such that the top of the line indicates the intensity value recorded by the corresponding sensor pixel. Each line extends down to the top of the lowest adjacent point below it, ensuring that the resulting spectrum forms a continuous curve.

The Microcontrollers: Program Operation

Programmable microcontrollers have become increasingly versatile tools in the laboratory, as evidenced by their use in a wide range of applications including the fabrication of gas chromatography columns [11], experimental laser surgery [12], determination of semiconductor band gaps [13] and laser stabilization [14]. The main properties of the particular family of microcontroller used here, along with programming details are given in [14]; the Microchip PIC18F2320 microcontrollers used have the advantage of a wide range of clock speeds and input logic voltages, and a large program memory space.

Figure 2:
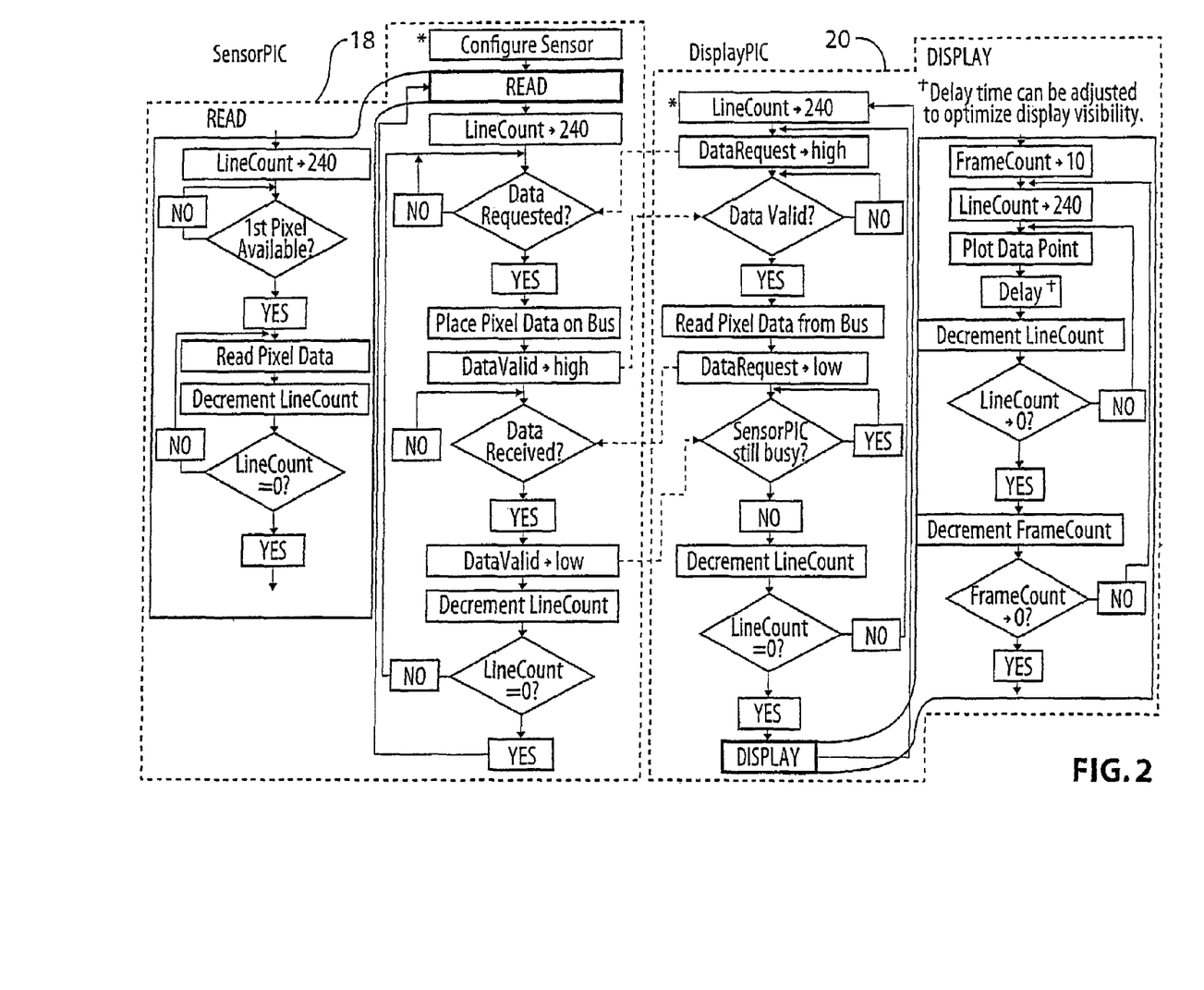
FIG. 2 is an operational flow chart of processes executed by the analyzer of FIG. 1.

The OSA program, illustrated in FIG. 2, is split into two separate processes, each running on a dedicated PIC18F2320 microcontroller 18, 20 with an independent clock. One of these, the SensorPIC 18, communicates with the image sensor 16 and is therefore required to output 3.3 V logic, while the second, the DisplayPIC 20, continuously updates the LCD image, requiring 5 V logic output. In order to transfer data from the sensor to the display 24 it is necessary for the two microcontrollers 18, 20 to communicate frequently; despite the use of different output logic levels, this occurs without voltage translation due to the wide window of voltage inputs acceptable to the PICMicro® devices.

Thus, FIG. 2 is a flow chart illustrating the operation of the processes executed by the microcontrollers. Each process begins with the operation indicated by the asterisk. Details of the READ and DISPLAY subroutines are shown.

The two microcontrollers 18, 20 run at different clock speeds due to the technical requirements of their peripherals. A custom protocol is therefore implemented to enable communication between them ensuring no data is lost. There are two control lines (data request 26 and data valid 28), denoted by the dotted arrows in FIG. 2, and a parallel bus, for instance an 8-bit data bus 30. The DisplayPIC initiates transfer by setting the data request line high, the SensorPIC then makes the 8-bit value to be transferred available on the bus and sets the data valid line high. The DisplayPIC subsequently reads the data and sets the data request line low to indicate that the data has been received, and the SensorPIC then sets the data valid line low to ensure the same value is not retransferred on the next request.

Upon startup the SensorPIC 18 configures the image sensor 16 as described in section 2.2, using $I^2C$ serial communication. It then reads a line of intensity data from the observation window as soon as it becomes available, and waits for a data request from the DisplayPIC 20. As our display has 240 rows, we require, in this example, fewer data points than are provided by the 1280 pixel width of the image sensor, therefore every fifth pixel is read until all 240 values have been recorded. Increased spatial resolution has been obtained by reading every second sensor pixel and this may be applied to displays with more rows, if desired. External, instead of internal, clocking of the microcontroller would permit every sensor pixel to be read, should a horizontal resolution of 5.2 μm be required. In all cases the image values are transferred to the DisplayPIC according to the communication protocol described above.

Due to the finite rise and decay time-constants of the display pixels, obtaining a good image requires careful control of the timing associated with writing to the LCD 24. To this end, the same image is plotted on the display ten times (enumerated by the variable FrameCount) before a new set of data is requested by the DisplayPIC 20. In order to optimize the contrast of the display, a delay is inserted after each data point is plotted; its duration can be adjusted during operation.

The following is an exemplified sensor microcontroller process:

1. Configure sensor using the I²C serial communication protocol [16]. The micro controllers have a built-in I²C module, however the pins required are involved with data transfer, so a custom subroutine was created to do the configuring using normal I/O pins. The configuration settings are:

Setting the active window (i.e. the pixels being read) to use the entire 1280 pixel width of the sensor, and the minimum height of 3 pixels. As the pattern is circularly symmetric, a radial slice from the centre contains all of the information.

Setting the horizontal and vertical blanking to minimum, meaning that all of the pixels within the active window are read.

Reducing the pixel integration time to 7.55 ms to reduce the sensitivity, allowing less time for charge to accumulate.

Note: all other actions within the process are part of a loop; configuration is performed at power-up only.

2. Read data subroutine.

Set the LineCount counter to 240, representing the 240 columns of the display (note that as we orient the display perpendicularly to how it was intended: the columns were intended to be rows; we will refer to them as we use them).

Test for LineValid signal from sensor; 1=valid intensity data on data-bus from sensor, 0=between rows, data on bus not valid. Once LineValid=1, read 8-bit intensity value and store in data memory (SRAM, of which 512 bytes available) using indirect addressing [17].

Decrement LineCount.

If LineCount has not reached zero then read another byte of data from bus.

Continue loop until all 240 intensity values have been read and stored in the data memory.

Note on timing: sensor microcontroller has internal clock running at 8 MHz and outputs clock signal for sensor at 2 MHz. Each instruction executed by the microcontroller takes exactly four internal clock cycles, so one instruction is executed for every sensor clock cycle. The read data loop includes five instructions, hence data is only recorded for one out of every five pixels. Consequently we use a width of 240×5=1200 pixels out of the 1280 in a single row on the sensor.

3. Transfer data to display microcontroller.

Set the LineCount counter to 240, representing the 240 columns of the display.

Test for DataRequest signal from display microcontroller. 1=ready to receive data, 0=not ready. Once DataRequest=1, place 8-bit intensity value from data memory on data bus between the two microcontrollers.

Set Data Valid signal high, tells display microcontroller that it can now read data from the bus.

Test for DataRequest signal from display microcontroller. 1=data not yet received, 0=data received. Once DataRequest=0, set DataValid low to ensure the same value is not retransferred on the next request.

Decrement LineCount.

If LineCount has not reached zero then test for DataRequest signal again and continue.

Continue loop until all 240 intensity values have been transferred to the display microcontroller.

Once all data has been transferred, goto read data subroutine.

Display Microcontroller Process:

1. Receive data from sensor microcontroller.

Set the LineCount counter to 240, representing the 240 columns of the display.

Set DataRequest signal high.

Test for DataValid signal from sensor microcontroller. 1=valid data available on bus, 0=data not valid. Once DataValid=1, read a byte of intensity data from the bus and store it in data memory using indirect addressing [17].

Set DataRequest signal low, tells sensor microcontroller that data has been received.

Test for DataValid=0 from sensor microcontroller. 1=sensor microcontroller still busy, 0=ready to continue. Once DataValid=0, continue.

Decrement LineCount.

If LineCount has not reached zero then goto "set DataRequest signal high".

Continue loop until all 240 intensity values have been received from the sensor microcontroller.

Once all data has been transferred, goto display data subroutine.

2. Display data subroutine.

Set the FrameCount counter to 10. Each frame (image) is refreshed 10 times. As refreshing the same image is quicker than updating to the next image, this improves the visibility. Note: this number has not been optimized, a number other than 10 may work better.

Set the LineCount counter to 240, representing the 240 columns of the display.

Plot a data point. The 8-bit datum gives a scaled intensity value between 0 and 255. The marker placed on the current column (as indicated by the current value of LineCount) includes a line of dark pixels, whereby the top of the line corresponds to the intensity value and the line extends down to the top of the lowest adjacent point below it, ensuring that the resulting curve is continuous.

User adjustable delay inserted at this point allows contrast to be optimized.

Decrement LineCount.

If LineCount has not reached zero then goto "plot a data point" to plot the next intensity value.

Continue loop until all 240 intensity values have been plotted (one full frame).

Decrement FrameCount.

If FrameCount has not reached zero then goto "Set the LineCount counter to 240".

Continue loop until the current image has been refreshed 10 times (i.e. FrameCount=0).

Goto "Receive data".

System Performance

Figure 3A:
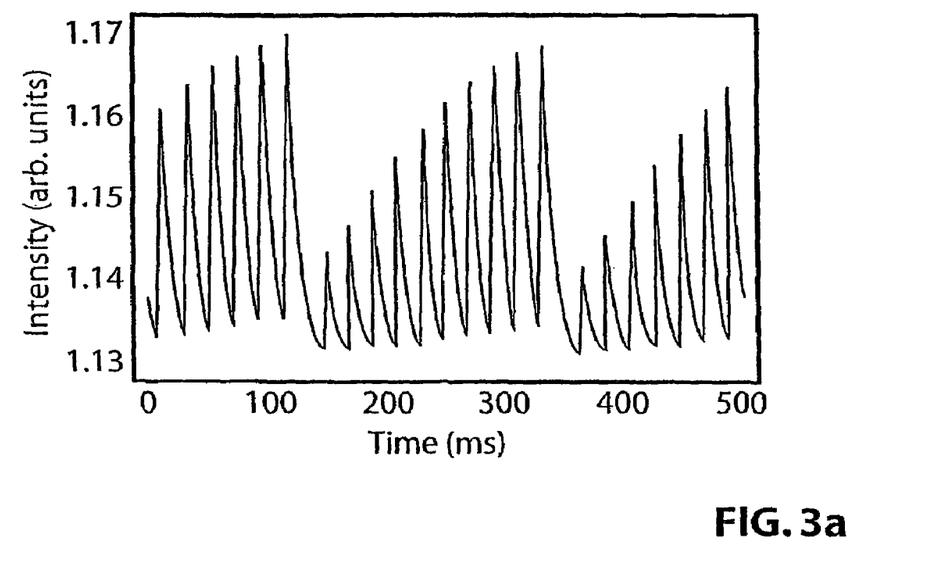
FIGS. 3(a) and 3(b) are plots of intensity from an LCD in the device of FIG. 1 in one operational mode.
Figure 3B:
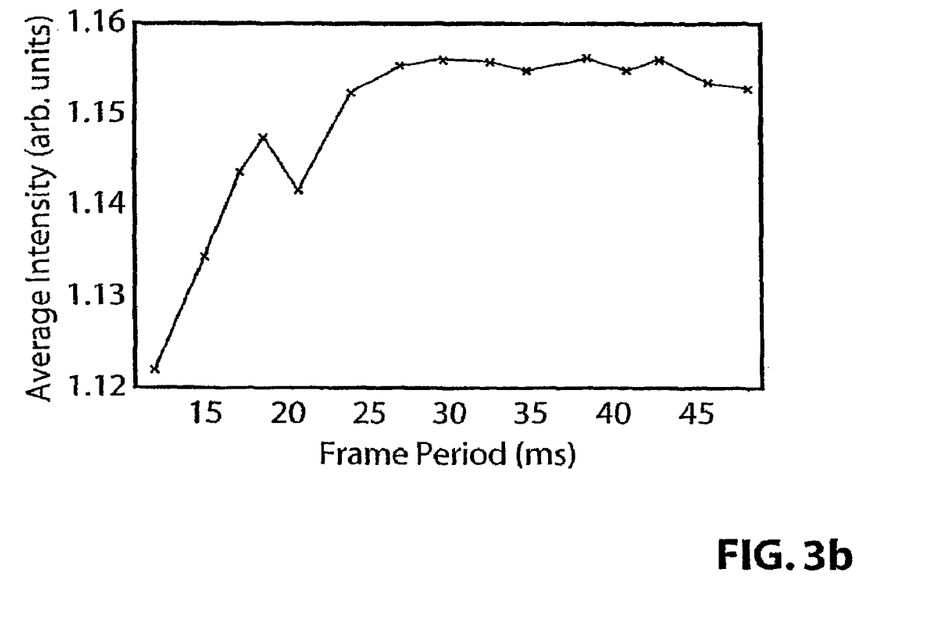

In order to quantify the effect of the inserted delay on the image contrast of the LCD, a photodiode (Burr-Brown OPT101) was used to record the intensity from display pixels that were programmed to be bright, for different durations of this delay. A set of periodic peaks in the emitted intensity were observed with the same frequency as the frame refresh rate, with an additional delay every ten frames corresponding to the acquisition of new data by the DisplayPIC. An example of such a trace for a frame period of 18.5 ms is shown in FIG. 3(a), in which an increasing of the pixel brightness with repeated addressing is visible within each set of ten peaks, as is the effect of the finite decay time-constant of each pixel (which was determined to be 20 ms). These traces were obtained for a variety of delays which showed that longer delays allow the peak intensities to increase, but also provide more time for decay. The apparent optimal contrast occurred when the frame-period was 28 ms, which corresponded to the time-averaged intensity approaching its maximum, as shown in FIG. 3(b). Further increases in delay do nothing to increase the average intensity and cause visible flicker.

FIG. 3(a) shows an Intensity variation from a set of display pixels for a total frame period of 18.5 ms; the peak intensity increases as ten identical frames are written to the display, followed by a diminishment in intensity as new data is obtained from the SensorPIC. As can be seen in FIG. 3(b), the time-averaged display intensity is seen to increase with increasing frame period up to a maximum of 28 ms, above which it remains constant. The anomalous value at a frame period of 20.5 ms occurs due to beating between the display refresh rate and the acquisition of new data.

Figure 4:
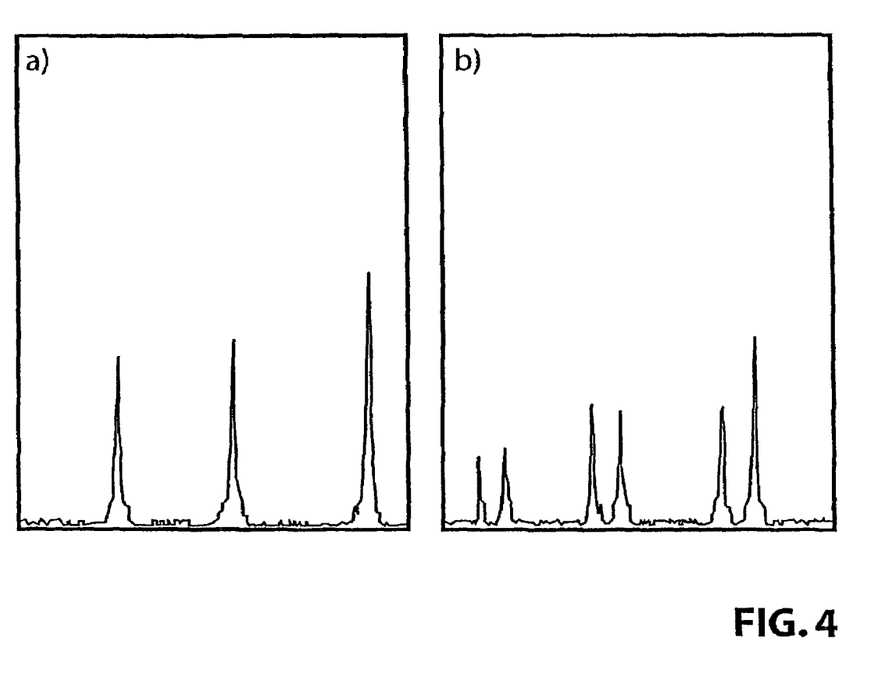
FIG. 4 illustrates digital photographs of different outputs of the optical spectrum analyzer in FIG. 1 for different light source inputs.

To demonstrate the operation of the optical spectrum analyzer, the mode structure of an external cavity diode laser (ECDL) at 670 nm [15] was observed using a 0.5±0.05 mm solid etalon (OFR IE-0.5-VIR-R-S) with a nominal reflectance for each face of 90% within the wavelength range 550-780 nm. With the 8 MSB being recorded a small fraction (3.3 µW) of the laser beam was obtained by reflection from two uncoated wedges and sent into the OSA, as shown in FIG. 1. The ECDL operates on a single mode only within a set of narrow ranges of current, temperature and cavity length. FIG. 4(a) shows single-mode operation at an injection current of 55.5 mA, in which the $2^{nd}$ order fringe (p=2) from the Fabry-Perot interference pattern is on the right, with decreasing spacing between adjacent fringes asp increases. The finesse is measured to be 23±3, indicating a reflectivity of 93% at 670 nm. The current was then increased to 56.6 mA resulting in multi-mode operation as shown in FIG. 4(b). Typical diode lasers [2] of length 250 µm have longitudinal modes separated by ~40 GHz, and we have previously determined using a calibrated wavemeter [14] that our ECDLs mode-hop by this amount. FIG. 4(b) shows the original mode remaining visible on the right of each pair of fringes, with a second mode separated by 47 GHz appearing to the left.

For a comparison of the laser power required by this system with that from a commercial OSA, the same laser beam was analyzed by a Coherent model 240 piezoelectically-driven Fabry-Perot using an oscilloscope (Agilent 54622A) with averaging of eight traces. No signal was observed above the noise floor at the incident power of 3.3 µW, and the spectrum began to be visible only after the incident power was increased above 8 µW.

FIG. 4 illustrates digital 1 photographs from a Canon Powershot A510 of (a) single mode operation, and (b) multi-mode operation analyzed by the OSA 10.

Figure 5A:
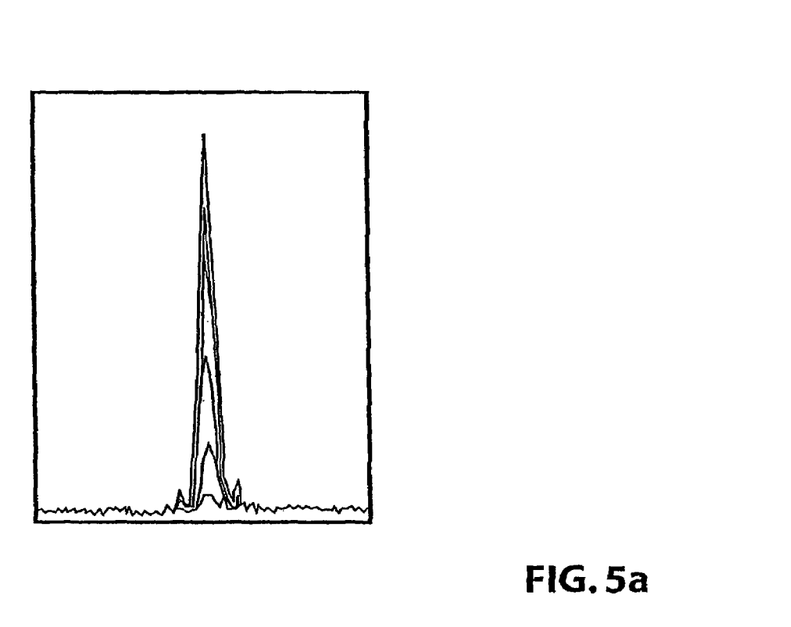
FIG. 5(a) shows a composite digital photograph of the profiles for 6 different incident laser intensities with FIG. 5(b) showing a plot of the maximum height of those same profiles against the incident intensities.
Figure 5B:
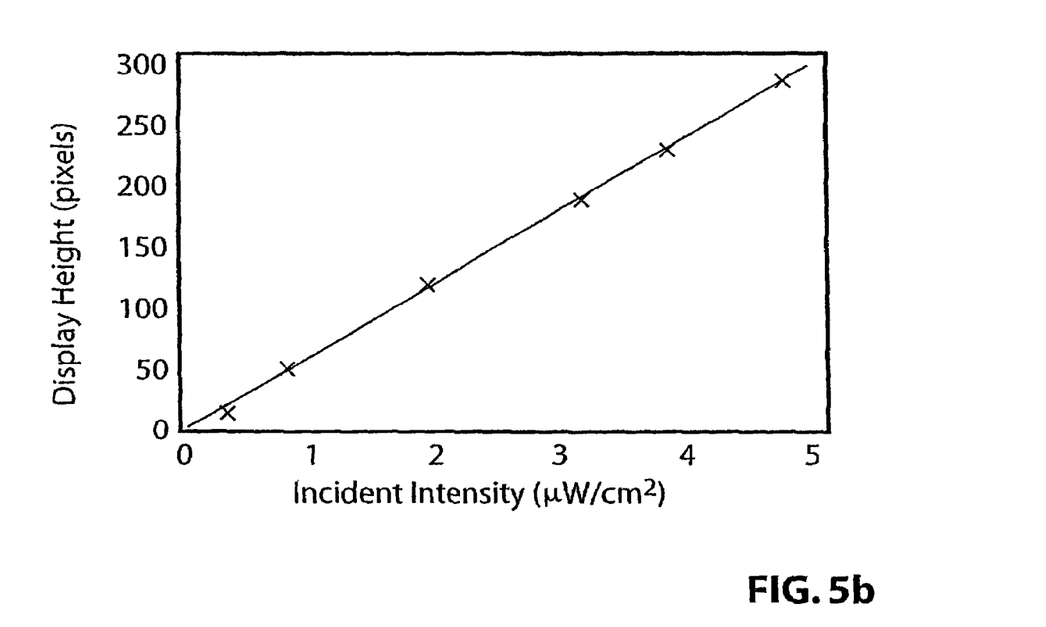

To provide an indication of the limiting sensitivity of the instrument, this interference pattern was obtained using the 8 LSB from the image sensor. An incident power of 0.75 µW on the etalon resulted in a signal to noise ratio of the fringes that was 14. We also determined the linearity and sensitivity of the imaging system using a dynamic range of 320, which made use of the entire display. Six traces were taken of the far-field diffraction pattern from a 300 µm diameter aperture illuminated by the ECDL, with variable attenuation provided by rotating a linear polarizer placed before the optical isolator. Photographs of these traces with increasing incident power have been overlaid with consistent scale and are shown in FIG. 5(a). The peak intensity at the centre of each diffraction pattern was determined by equating the measured power after the aperture to the integrated intensity from an Airy function that was fitted to each trace. FIG. 5(b) shows the resulting calibration curve, with the incident intensity plotted against the intensity values obtained from the image sensor.

FIG. 5(a) illustrates a composite digital photograph of the diffraction pattern from a 300 µm aperture for six incident laser powers. FIG. 5(b) shows a calibration curve demonstrating the response of the image sensor to light of different intensities; a pixel integration time of 7.55 ms was used for all of these results.

One advantage of the programmable microcontroller approach adopted here is that it allows rapid modification of the optical system for a wide range of specialized tasks. As an example, the DisplayPIC was reprogrammed within 20 minutes to produce a curve displaying the maximum intensity detected since turn-on by each pixel within the observation window of the image sensor. The variation in pixel sensitivity across the width of the sensor was then investigated using a flashlight incident on the 300 µm aperture as a constant intensity light source, while the sensor was laterally translated across the beam. The fractional variation $(\sigma_{n-1}/\omega)$ of the recorded intensity, I, was 1.4%, demonstrating uniform sensitivity across the active width of the sensor, which allows for accurate location of the peaks within the fringe pattern.

We have demonstrated a compact, modified, inexpensive and scalable optical spectrum analyzer that exploits the adaptable nature of programmable microcontrollers to determine the mode structure of a diode laser for a fraction of the cost of a commercial OSA. A slice of a fixed Fabry-Perot interference pattern was detected by a CMOS image sensor and recorded by a programmable microcontroller. A second microcontroller processed the image data to display the resulting spectrum in real time on an LCD. The OSA can be modified for use with any CW laser, by using a different etalon and associated lenses, appropriate to the mode spacing of the laser in question. The software may be adapted to similarly analyze pulsed lasers using the modification described in section 3, in which the y-value at each line of the display represents the maximum intensity detected by the corresponding sensor pixel.

While the performance with the 240×320 display is more than satisfactory for the mode structure determination described herein, we have demonstrated techniques that permit the full image sensor resolution to be used in conjunction with displays with higher pixel counts. Such techniques will be particularly valuable for higher resolution imaging of other interference patterns and laser beam profiles.

Thus, in one example, there is provided a highly sensitive and adaptable angle-resolved optical spectrum analyzer constructed using off-the-shelf components. The flexible nature of programmable microcontrollers is exploited by this device, resulting in a diagnostic tool that can determine the mode structure from a variety of lasers, and monitor laser beam profiles in real time. A readily available CMOS image sensor provides sensitive detection of a Fabry-Perot interference pattern, and outputs a digital signal suitable for processing by these microcontrollers. In place of an oscilloscope, a considerably less expensive component-level LCD is used which is addressed by a microcontroller. Using a solid etalon with a free spectral range of 210 GHz, we demonstrate the ability of the device to determine the mode structure of an external cavity diode laser in real time. We show this device to be competitive with a commercial optical spectrum analyzer, both in terms of dynamic range and sensitivity. The low incident laser power required by this system (0.75 µW) can typically be obtained from a back reflection from an optic, and this compact, low-cost device allows for the provision of a dedicated spectrum analyzer for each laser system of interest.

The entire subject matter of each of the references listed below is incorporated herein by reference:

[1] Hercher M 1969 *App. Opt.* 8 1103
[2] Schröder H W, Dux H and Welling H 1975 *Appl. Phys.* 7 21
[3] Wieman C E and Hollberg L 1991 *Rev. Sci. Instrum.* 62 1
[4] Bhatia K S 1984 *Am. J. Phys.* 52 738
[5] Bures J, Meyer P, Saint-Dizier J-P et Gagné J-M 1980 *Appl. Opt.* 19 1373
[6] McIntyre I A and Dunn M H 1983 *J. Phys. E: Sci. Instrum.* 17 274
[7] O'Hara M, Bowe B and Toal V 2005 *J. Opt. A: Pure Appl. Op.* 7 S364
[8] Fossum E R and Nixon R, 1997 U.S. Pat. No. 5,841,126
[9] Predko M 2001 *Programming and Customizing PICmicro® Microcontrollers, 2$^{nd}$ ed.* (New York: McGraw-Hill)
[10] Born M and Wolf E 2002 *Principles of Optics 7$^{th}$ ed.* (Cambridge: Cambridge University Press)
[11] Reidy S, George D, Agah M and Sacks R 2007 *Anal. Chem.* 79 2911
[12] Geldi C, Bozkulak O, Tabakoglu H O, Isci, S, Kurt A and Gulsoy, M 2006 *Photomedicine and Laser Surgery,* 24, 723
[13] Mukaro R, Taele B M, Tinarwo D 2006 *Eur. J. Phys.* 27 531
[14] Ugray M, Atfield J E, McCarthy T G and Shiell R C 2006 *Rev. Sci. Instrum,* 77 113109
[15] Magnus F, Boatwright A L, Flodin A, and Shiell R C 2005 *J. Opt. B: Quantum Semiclass. Opt.* 7 109
[16] MT9M001C12STM CMOS image sensor datasheet, downloaded on 21 May, 2008 from: http://download.micron.com/pdf/datasheets/imaging/mt9m001_1300_mono.pdf (page 11 onwards)
[17] PIC18F2320 datasheet, downloaded on 21 May, 2008, from http://ww1.microchip.com/downloads/en/devicedoc/39599c.pdf (page 66 onwards)
[18] *The Art of Electronics,* (page 724 onwards), P. Horowitz and W. Hill, Cambridge University Press, 2$^{nd}$ edition, 1989

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. An imaging system comprising an optical sensing unit, with a plurality of sensor locations, each sensor location being responsive to an incident optical signal to generate a local analog intensity value representative of the intensity of the optical signal at the sensor location, the sensing unit including a digital interface to deliver a local digital intensity value corresponding to the local analog intensity value, a first microcontroller function in communication with the digital interface for sequentially collecting local digital intensity values to form a group of digital intensity values corresponding to an intensity variation across the array over a predetermined sensing period, a second microcontroller function cooperating with the first microcontroller function to receive the group of digital intensity values for transfer to an output device.

2. A system as defined in claim 1, the plurality of sensor locations being oriented in a one dimensional array.

3. A system as defined in claim 1, the output device including a display unit or a data storage unit.

4. A system as defined in claim 3, the data storage unit including a computer or a storage device.

5. A system as defined in claim 3, the display unit including a liquid crystal display.

6. A system as defined in claim 5, the liquid crystal display having a plurality of rows and columns, a driver function to scan the display grid progressively by row, each row corresponding to a sensor location or consecutive group of sensor locations, to display a marker on each row at a position corresponding to the intensity of the optical signal at the sensor location or consecutive group of sensor locations, the liquid crystal display being oriented to display the intensity values as a horizontal trace.

7. A system as defined in claim 1, the first and second microcontroller functions being provided by corresponding first and second microcontroller units.

8. A system as defined in claim 7, further comprising a data transfer bus between the first and second microcontroller units.

9. A system as defined in claim 8, the data transfer bus utilizing a transfer synchronization protocol.

10. A system as defined in claim 9, the transfer synchronization protocol being implemented using a first signal line and a second signal line, the protocol including a first mode in which the second microcontroller is a receiver and sets the first signal line to logic-high indicating a request for data, a second mode in which the first microcontroller is a sender and places data on the data transfer bus, the sender setting the second signal line to logic-high indicating that data has been placed on the data transfer bus, the receiver reading data from the data transfer bus, the receiver setting the first signal line to logic-low indicating that data has been received, the sender setting the second signal line to logic-low to ensure that the same data value is not retransferred on the next request from the receiver.

11. A system as defined in claim 10, the image sensing unit and the microcontrollers being configured to transfer instructions for changing system parameters.

12. A system as defined in claim 8, the first and second microcontroller units operating on independent clock frequencies.

13. A system as defined in claim 8, the first and second microcontroller units operating on a common clock frequency or otherwise dependent clock frequencies.

14. A system as defined in claim 8, the first and second microcontroller units operating at the same voltage, that voltage defining the logic-high level for exchanging data between the optical sensing unit and the first microcontroller, exchanging data between the two microcontroller units on the data transfer bus, and exchanging data between the second microcontroller unit and an output device.

15. A system as defined in claim 8, the first microcontroller unit operating at a voltage determined by the requirements of the optical sensing unit, the second microcontroller unit operating at a voltage determined by the requirements of the output device, the data transfer bus including digital logic signals at both voltages utilizing the wide input voltage ranges of the microcontrollers.

16. A system as defined in claim 1, the optical sensing unit having a sensitivity that is adjusted by a user according to a power level of the incident optical signal.

17. A system as defined in claim 16, the optical sensing unit having a plurality of configuration registers including window height and row start for windowing, and shutter width for pixel integration time, the registers being adjusted according to measured characteristics of the incident optical signal, the registers being accessible to the user.

18. An imaging system as defined in claim 1, further comprising a dispersive device positioned at an upstream location relative to the optical sensing unit, on an optical path to receive an incident light beam, the optical sensing unit being positioned at a downstream location to receive an incident optical interference pattern from the dispersive device thereon, the optical sensing unit being oriented to register intensity values with positions corresponding to different wavelengths present or absent in the incident light beam, the digital intensity values collected by the first microcontroller function representative of the intensity variation across the sensor locations corresponding to the wavelength content of the light beam within a particular range of wavelengths.

19. An imaging system as defined in claim 18, the dispersive device including a transmissive or reflective diffraction grating, or a prism, or a Fabry-Perot or Fizeau interferometer.

20. A method of imaging an optical signal, comprising providing a plurality of sensor locations, each sensor location being responsive to an incident optical signal to generate a local analog intensity value representative of the intensity of the optical signal at the sensor location, providing a digital interface to deliver a local digital intensity value corresponding to the local analog intensity value, providing a first microcontroller in communication with the digital interface, configuring the first microcontroller to sequentially collect local digital intensity values to form a group of digital intensity values corresponding to an intensity variation across the array over a predetermined sensing period, providing a second microcontroller to receive the group of digital intensity values, and configuring the second microcontroller to transfer to the group of digital intensity values to an output device.

* * * * *